J. H. REED.
VEHICLE WHEEL.
APPLICATION FILED JUNE 13, 1910.
1,001,982.
Patented Aug. 29, 1911.
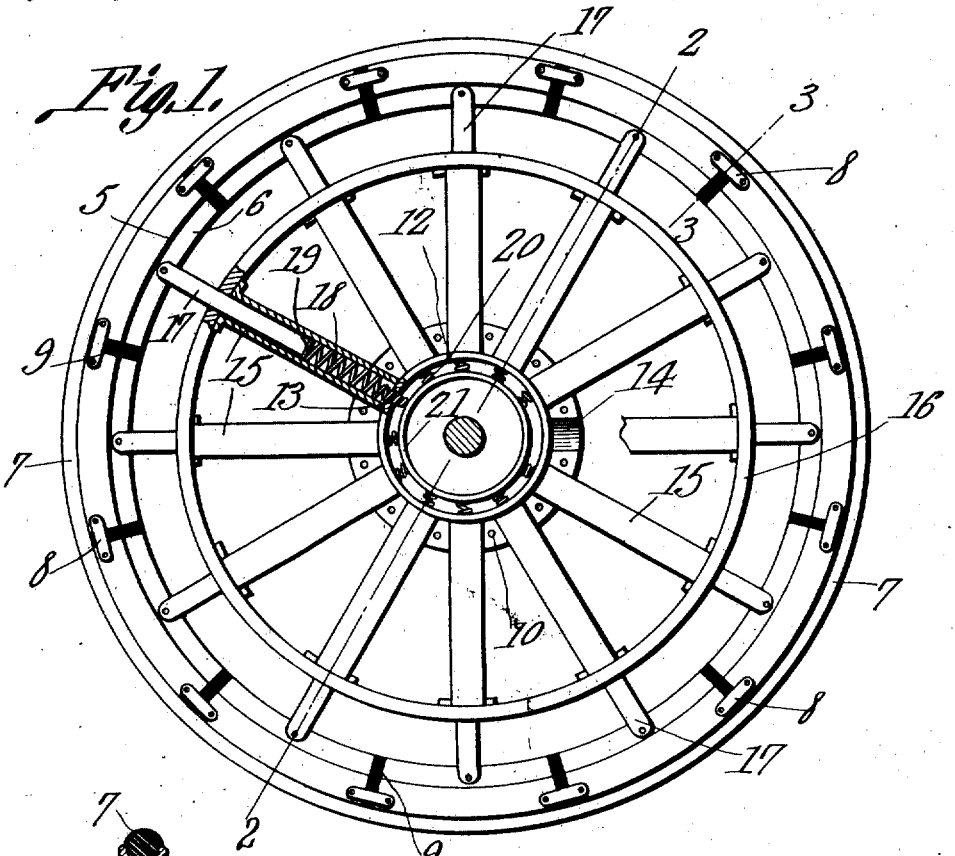
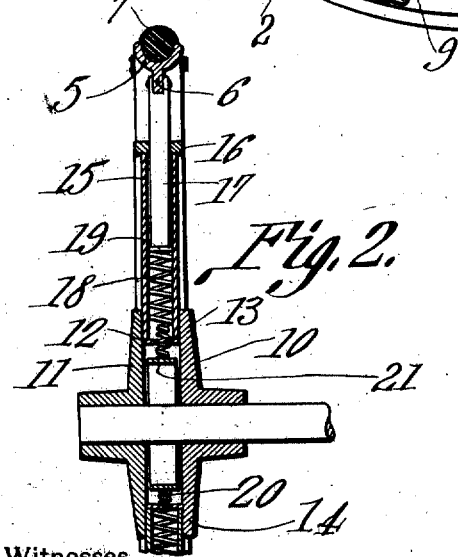
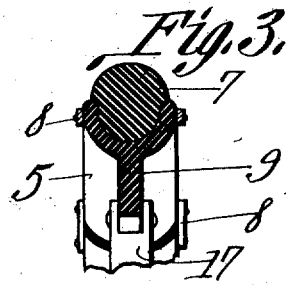
John H. Reed, Inventor

UNITED STATES PATENT OFFICE.

JOHN H. REED, OF LANCASTER, WISCONSIN.

VEHICLE-WHEEL.

1,001,982.  Specification of Letters Patent.  Patented Aug. 29, 1911.

Application filed June 13, 1910. Serial No. 566,614.

*To all whom it may concern:*

Be it known that I, JOHN H. REED, a citizen of the United States, residing at Lancaster, in the county of Grant and State of Wisconsin, have invented a new and useful Vehicle-Wheel, of which the following is a specification.

It is the object of the present invention to provide an improved construction of vehicle wheel and the invention relates more particularly to that class of such wheels which are designed to embody all the advantages of a pneumatic tired wheel although solid or semi-yieldable tires are employed in the place of pneumatic tires.

The invention, more specifically speaking, relates to that class or type of such wheels in which the felly is made up of a plurality of connected sections and one feature of the invention resides in interposing between these connected felly sections, rubber or otherwise elastic pads which, while they permit of relative yielding or giving of the sections, cushion this yielding movement thereof.

It is a further aim of the invention to provide in the hub of a wheel of this type, a floating resilient annulus, preferably in the nature of a resilient metal ring and to provide also spokes which are connected at their outer ends one to each of the felly sections above described and at their inner ends have indirect bearing against the said yieldable annulus so that a double cushioning effect is afforded.

With the above and other objects in view, the invention consists in the general construction and arrangement of parts shown in the accompanying drawings, in which, Figure 1 is a view in side elevation partly in section of a wheel embodying the present invention, Fig. 2 is a sectional view on the line 2—2 of Fig. 1, and, Fig. 3 is a similar view in detail on the line 3—3 of Fig. 1.

In the drawings, the wheel is illustrated as having its felly made up of a plurality of sections and each of these sections is in the form, in transverse section, of a transversely curved rim part indicated by the numeral 5 having a medial flange indicated by the numeral 6. As stated, the sections embody a transversely curved rim part and in the concavity of the rim parts of the sections, when the sections are properly connected, there is disposed a tire indicated by the numeral 7, which tire is preferably of solid rubber. In connecting the felly sections together, they are disposed end to end and links indicated by the numeral 8 are pivoted at their extremities to the abutting ends of the several sections. These sections may yield although firmly connected in an annular series. In order that this yielding of the several felly sections may be cushioned so that a rattling sound will not result and so that their pivots formed of the links 8 will not be subjected to any considerable stress, rubber or otherwise elastic cushions 9 are interposed one between the assembled ends of each pair of felly sections and these cushions are straddled by the links 8 which connect the said ends of the sections.

The hub of the wheel embodying the present invention comprises a member 10 and a member 11, the member 10 having a lateral annular flange 12 which, for a purpose to be presently explained, is formed at equi-distant points through out its circumference with openings 13. These hub members 10 and 11 are secured together in the relation illustrated in Fig. 2 of the drawings and are formed with sockets or recesses 14 to receive the inner ends of tubular spoke sections 15. At their outer ends, these spoke sections 15 are secured to an annulus 16 so that this annulus is rigidly supported with respect to the hub and the spoke sections 15 are so relatively positioned that their inner ends will register with the openings 13 in the flange 12 of the hub section 10 and their outer ends will be directly opposite a point midway between the ends of the adjacent felly section, this relationship being maintained at all times.

In addition to the section 15, each spoke of the wheel embodies a section indicated by the numeral 17 and fitted slidably in the related section 15 and the outer end of each of these sections 17 is pivotally connected to the flange 6 of the related felly section 5.

A spring indicated by the numeral 18 is arranged within each of the spoke sections 15 and each of the spoke sections 17 is provided at its inner end with a disk like head 19 bearing against the outer end of the related spring 18 and furthermore, each spring is formed at its inner end with a reduced portion or in other words has its helices decreased in diameter as indicated by the numeral 20 and projecting through the openings 13 in the flange 12, heretofore mentioned.

Arranged within the hub and more specifically speaking within the bounds of the flange 12 is a floating resilient annulus indicated by the numeral 21 and the inner ends of the springs 13 above described, bear at equi-distant points against the outer circumferential surface of this annulus. As stated, this annulus is resilient and while the body of each spring affords a spring between the fixed and slidable sections of the spokes, the bearing of the smaller inner ends of the springs against the resilient and yieldable annulus 21 affords an additional cushion between the hub and the felly of the wheel. It is to be particularly noted at this point that not only is the annulus 21 resilient, but it is also compressible or yieldable and that it may be made of any suitable material and not necessarily of metal.

What is claimed is:—

1. In a wheel, a felly comprising a plurality of connected sections, a hub, a resilient annulus mounted in the hub, and spokes connected to the felly sections and having each a resilient section bearing against the said annulus.

2. In a wheel, a felly comprising a plurality of connected sections, a hub, a yieldable annulus loosely mounted in the hub, and a plurality of spokes connected one to each of the felly sections and having each a resilient section bearing against the said annulus.

3. In a wheel, a felly comprising a plurailty of connected sections, a hub, a resilient floating annulus in the hub, and a plurality of spokes connected one to each of the felly sections and having each a resilient section bearing against the said annulus.

4. In a wheel, a felly comprising a plurality of connected sections, a hub, a resilient annulus mounted in the hub, a plurality of spokes connected one to each of the felly sections, each of said spokes embodying a rigid member and a spring against which the rigid member bears, said spring having bearing against the resilient annulus.

In testimony that I claim the foregoing as my own, I have hereto affixed my signature in the presence of two witnesses.

JOHN H. REED.

Witnesses:
S. H. TAYLOR,
C. H. BASFORD.

---

Copies of this patent may be obtained for five cents each, by addressing the "Commissioner of Patents, Washington, D. C."